US012692744B2

(12) United States Patent
Wulbrandt et al.

(10) Patent No.: US 12,692,744 B2
(45) Date of Patent: Jul. 28, 2026

(54) REVOLVING DOOR AND METHOD FOR CONSTRUCTING A REVOLVING DOOR

(71) Applicant: DORMAKABA DEUTSCHLAND GMBH, Ennepetal (DE)

(72) Inventors: Tim Wulbrandt, Ennepetal (DE); Daniel Fabri, Ennepetal (DE); Thomas Irrgang, Ennepetal (DE); Bernhard Heitz, Ennepetal (DE); Thomas Uebelgünne, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 0 days.

(21) Appl. No.: 18/993,328

(22) PCT Filed: Jun. 21, 2023

(86) PCT No.: PCT/EP2023/066748
§ 371 (c)(1),
(2) Date: Jan. 10, 2025

(87) PCT Pub. No.: WO2024/012823
PCT Pub. Date: Jan. 18, 2024

(65) Prior Publication Data
US 2025/0263970 A1 Aug. 21, 2025

(30) Foreign Application Priority Data
Jul. 11, 2022 (EP) .................................... 22184175

(51) Int. Cl.
*E06B 3/90* (2006.01)

(52) U.S. Cl.
CPC ..................................... *E06B 3/90* (2013.01)

(58) Field of Classification Search
CPC .................................. E06B 3/90; E06B 3/903
(Continued)

(56) References Cited

U.S. PATENT DOCUMENTS 4,358,909 A * 11/1982 Trikilis ..................... E06B 3/90 49/46
6,266,922 B1 * 7/2001 Rockenbach ......... E05F 15/608 49/42
(Continued)

FOREIGN PATENT DOCUMENTS

CH 684844 A5 * 1/1995 ............... E06B 3/90
CN 209742680 U 12/2019
(Continued)

OTHER PUBLICATIONS

CH684844A5 English Translation from Google Patents (Year: 1995).*
(Continued)

*Primary Examiner* — Muhammad Ijaz
*Assistant Examiner* — Susan M. Heschel
(74) *Attorney, Agent, or Firm* — CANTOR COLBURN LLP

(57) ABSTRACT

A revolving door has a turnstile that is arranged between opposite drum elements, and a ceiling assembly which is arranged on the drum elements at the top and on which the turnstile is rotatably mounted. At least one of the drum elements has an inner glass element and an outer glass element. The drum element has a lateral offset, in particular on both sides of the drum element, between the inner glass element and the outer glass element.

13 Claims, 5 Drawing Sheets

(58) Field of Classification Search
USPC .............................................................. 49/42
See application file for complete search history.

(56) References Cited

U.S. PATENT DOCUMENTS

| | | | | |
|---|---|---|---|---|
| 7,104,008 | B2 * | 9/2006 | Yokotachi ................. | E06B 3/90<br>49/40 |
| 9,243,428 | B1 * | 1/2016 | Miracle ............... | E05B 73/0005 |
| 11,851,928 | B2 * | 12/2023 | Åsbo ..................... | E06B 1/6015 |

FOREIGN PATENT DOCUMENTS

| | | | | | |
|---|---|---|---|---|---|
| CN | 210067833 | U | | 2/2020 | |
| DE | 3730031 | A1 | | 3/1989 | |
| DE | 102005049359 | A1 | * | 4/2007 | ............. E06B 3/903 |
| EP | 1605128 | B1 | | 8/2016 | |
| EP | 3611326 | B1 | | 3/2021 | |
| WO | WO-2021165349 | A1 | * | 8/2021 | ........... E06B 1/6015 |

OTHER PUBLICATIONS

DE102005049359A1 English Translation from WIPO (Year: 2005).*
International Search Report for Application No. PCT/EP2023/066748, dated Aug. 30, 2023, 2 pages, English translation.
Written Opinion for Application No. PCT/EP2023/066748, dated Aug. 30, 2023, 3 pages, English translation.
International Preliminary Report on Patentability with Annex for Application No. PCT/EP2023/066748, dated Sep. 19, 2024, 40 pages.
Chinese Office Action for Application No. 202380057735.5, dated Oct. 30, 2025, 12 pages with translation.

* cited by examiner

REVOLVING DOOR AND METHOD FOR CONSTRUCTING A REVOLVING DOOR

CROSS-REFERENCE TO RELATED APPLICATIONS

This application is a 35 U.S.C. § 371 National Stage patent application of PCT/EP2023/066748, filed on 21 Jun. 2023, which claims the benefit of European patent application 22184175.2, filed on 11 Jul. 2022, the disclosures of which are incorporated herein by reference in their entirety.

TECHNICAL FIELD

The disclosure relates to a revolving door having a turnstile that is arranged between opposite drum elements and having a ceiling assembly which is arranged on the drum elements at the top and on which the turnstile is rotatably mounted. The disclosure also relates to a method for assembling a revolving door.

BACKGROUND

EP 1 605 128 B1 discloses an example of a revolving door having a turnstile that is arranged between opposite drum elements and having a ceiling assembly that is arranged on the drum elements at the top and on which the turnstile is rotatably mounted. The revolving door thus comprises two opposite drum elements having a turnstile arranged therebetween, and the ceiling assembly is located on top of the turnstile and merges physically and structurally into the drum elements. The ceiling assembly is shown as forming a supporting structure with the drum elements, and the ceiling assembly has connecting elements arranged in the center of the revolving door, and with supports extending radially therefrom being provided, and inside the drum walls and beneath the ceiling assembly is arranged the turnstile, with the supports, which extend from the center to the drum walls, being held under pretension to create an upward force on the connecting elements.

Disadvantageously, this results in a high-rise ceiling assembly that has to be supported on beams or columns arranged on the outside of the drum elements.

Another exemplary embodiment of a revolving door is known from EP 3 611 326 B1. Here, too, it can be seen that the design of the ceiling assembly is complex and must be assembled on-site in structural unity with the drum elements. In particular, the drum elements have struts on which the ceiling assembly rests.

DE 10 2005 049359 A1 discloses a revolving door with door leaves which rotate around a center point and which are enclosed by two curved drum walls concentrically surrounding the door leaves. The drum walls are interrupted by an entrance and exit. At least one of the drum walls has a stationary, fixed part and a variable part. A night closure for a revolving door is also disclosed.

DE 37 30 031 A1 discloses a rotating door with a stationary cylindrical housing having an inlet and outlet opening and a door element which is rotatably mounted in the cylindrical housing and which divides the interior of the housing into at least two compartments. The rotating door is characterised by the fact that on the outside of the stationary cylindrical housing is provided a rotatably arranged cylindrical housing, the inlet and outlet opening of which can be brought into alignment with the corresponding inlet and outlet opening of the stationary housing or can be rotated relative thereto such that the interior of the rotating door is blocked. The rotating door can therefore be used to detain people, such as bank robbers etc.

CH 684 844 A5 discloses a revolving door. The housing of the revolving door is composed of a number of wall elements made of laminated glass, each of which is attached to brackets. The door leaves each have a seal on their outer edge running along the inner wall of the housing. Laminated glass substantially consists of an outer glass pane and an inner glass pane. The wall elements are held by a rail, which is screwed on using countersunk screws. The inner glass pane is recessed enough to allow the rail to be inserted. As a result, the surface of the housing inner wall facing the hinged doors is smooth. For this reason, this revolving door runs smoothly and quietly without making any noise. The seals are only subject to minimal wear. Nevertheless, the greatest possible sealing is guaranteed.

SUMMARY

The disclosure improves the assembly of a revolving door, in particular to improve the connection of the drum elements, preferably in conjunction with one or a plurality of support profiles. Due to the improved assembly, support profiles can be integrated as seamlessly as possible, in particular for transferring static and/or dynamic loads of the revolving door such that the appearance and/or statics of the revolving door can be improved. The disclosure improves the overall appearance and/or functionality of the revolving door.

This is achieved proceeding from a revolving door according to the claims and features disclosed herein. Advantageous further developments of the disclosure are indicated in the dependent claims.

The disclosure achieves the above advantage in that the drum elements each have an inner and an outer glass element, with at least one of the drum elements having an inner glass element and an outer glass element, with the drum element having a lateral offset, in particular on both sides of the drum element, between the inner glass element and the outer glass element. Preferably, the extension of the offset can be in a range from 1 cm to 15 cm, in particular from 2 cm to 10 cm, in particular from 3 to 5 cm. In particular, the offset is present in the installed state of the revolving door.

The lateral offset creates the possibility of improved integration of support profiles into the appearance and/or statics of the revolving door. In this context, the glass material can be designed in different ways, in particular as plastic glass or the like.

A support profile, in particular a post, is arranged in or on the at least one lateral offset. The support profile can be statically and/or visually recessed into the drum element and thus further improve the view or statics.

The support profile can be dimensioned and/or arranged such that it is flush with the drum element in its circumferential course and/or in its radial course inwards or outwards. This allows the maximum degree of visual or static integration into the drum element to be achieved.

It is also conceivable that the region of the lateral offset is coated and/or coloured to further improve the appearance. This can make any unsightly joints invisible.

Preferably, the inner glass element has a shorter horizontal length or width, in particular in the installed state of the revolving door, than the outer glass element, or else the outer glass element has a shorter horizontal length or width, in particular in the installed state of the revolving door, than the inner glass element such that a lateral offset occurs on at least one of the drum elements. In particular, this does not mean that the inner glass element is only shorter in width because it is arranged on the inside such that both glass elements are flush at the sides.

It is also conceivable that the inner glass element and the outer glass element of one drum element have the same horizontal length, but are arranged offset to each other. In this way, the inner glass element would protrude on one side of the drum element and the outer glass element would protrude on an opposite side. This would result in a lateral offset, which is designed differently depending on the side of the drum element.

It is preferred that the support profile is connected directly or indirectly to the drum element, in particular to the inner glass element and/or the outer glass element, and/or the ceiling assembly is connected directly or indirectly, in particular in a materially-bonded and/or force-fitting and/or form-fitting manner. This enables an advantageous type of connection.

It is preferred that the support profile is connected indirectly to the drum element and/or the ceiling assembly via a lateral profile element, in particular is connected in a materially-bonded and/or force-fitting and/or form-fitting manner. For its part, the profile element can be connected to the drum element and/or the ceiling assembly and/or the support profile in a materially-bonded and/or force-fitting and/or form-fitting manner. The lateral profile element preferably has a first leg and a second leg that is also designed to be perpendicular such that the profile element has an L-shape or a T-shape or a Z-shape in particular.

It is preferred that the inner glass element comprises at least two partial elements which are arranged next to each other, in particular in alignment, and which are arranged at a distance from each other to form an intermediate space, with an intermediate support profile being arranged in the intermediate space.

Alternatively or cumulatively, it is preferred that the outer glass element comprises at least two partial elements which are arranged next to each other, in particular in alignment, and which are arranged at a distance from each other to form an intermediate space, with an intermediate support profile being arranged in the intermediate space.

The glass element can therefore be divided by the intermediate support profile. As already described with regard to the lateral offset, it is possible that the intermediate support profile is connected to the partial elements, in particular via central profile elements, in particular in a materially-bonded and/or force-fitting and/or form-fitting manner. It is also possible that the intermediate support profile is flush with the partial elements. Such intermediate support profiles can further improve the statics of the revolving door, in particular with the monolithic impression of the drum elements continuing to be maintained. The intermediate support profiles can therefore also be recessed into the drum elements.

It is conceivable here that the glass elements are formed from more than two partial elements and therefore an intermediate support profile is arranged in the respective intermediate spaces.

Preferably, the extension of the intermediate space can be in a range from 1 cm to 15 cm, in particular from 2 cm to 10 cm, in particular from 3 to 5 cm.

Preferably, the ceiling assembly rests directly or indirectly on an upper finishing surface of the inner glass element and/or on an upper finishing surface of the outer glass element. In this context, the glass material can be designed in different ways, in particular as plastic glass or the like.

The drum elements are preferably constructed entirely or at least predominantly from curved glass elements such that each drum element has an inner glass element and an outer glass element such that this arrangement results in an advantageous accommodation of the ceiling assembly. Due to their curvature, the glass elements can also have a rigidity, load-bearing capacity and strength that is sufficient to accommodate the ceiling assembly, in particular with regard to the weight force and other forces acting externally.

The at least one drum element can have more than two, in particular three or four glass elements.

Since the ceiling assembly rests on the upper finishing surface of the inner glass element and/or on an upper finishing surface of the outer glass element, the load of the ceiling assembly can be transferred from the components of the drum elements. If the ceiling assembly rests on the upper finishing surface of the inner glass element, the ceiling assembly can be at least partially concealed by the outer glass element. In other words, the finishing surface of the inner glass element or the upper finishing surface of the outer glass element forms the upper edge side of the inner glass element or the outer glass element, which can for example have a thickness of 6 mm to 20 mm and preferably 8 mm to 16 mm.

The support of the ceiling assembly on the upper finishing surface can be indirect or direct such that it is also conceivable that an intermediate element, an intermediate layer, an adhesive or a profile element is still present between the ceiling assembly and the upper finishing surface of the inner glass element, such that the ceiling assembly still rests on the upper finishing surface of the inner glass element within the meaning of the present disclosure, without the ceiling assembly and the glass element having to touch or directly adjoin one another.

Particularly advantageously, the inner glass element has a shorter vertical length or height, in particular in the installed state of the revolving door, than the outer glass element, such that the outer glass element encloses the ceiling assembly on the outside at least partially or completely, in particular with respect to the height and/or with respect to the circumference of the ceiling assembly, preferably in the installed state of the revolving door, in particular when the ceiling assembly rests on the upper finishing surface of the inner glass element and/or on an upper finishing surface of the outer glass element. This can result in an upper offset between the inner and outer glass element such that the ceiling assembly can dip between the drum elements. The height specifications refer in particular to the installed state of the revolving door.

For example, the vertical length of the inner glass element can be shorter than the vertical length of the outer glass element by at least 20% to 100%, preferably by at least 50% to 100% and particularly preferably by at least 80% to 100%, in particular by 60% or 70%, of the height dimension of the ceiling assembly. In other words, the outer glass element does not have to extend over the entire height of the ceiling assembly on the outside and cover it; for example, the ceiling assembly can also only be covered on the outside by the outer glass element on a partial height. The lateral covering of the ceiling assembly is also only provided in the region of the drum elements, which do not fully enclose the revolving door in a manner known per se, but only over a partial circumference, such that the revolving door has entrance and exit sides for access by people.

Preferably, at least one of the drum elements has an upper offset between the inner glass element and the outer glass element. Preferably, the upper finishing surface of the outer glass element is higher than the upper finishing surface of the inner glass element. This allows the ceiling assembly to dip between the drum elements. The upper offset refers in particular to the installed state of the revolving door. The offset can result, for example, from the glass elements having different heights or being offset in height to one another.

The ceiling assembly can have a modular design and a sandwich structure, such that at least one filler material is provided as the core material, and the filler material has a cover plate on at least one or both cover surfaces. In this respect, only one top cover plate, only one bottom cover plate or one top and one bottom cover plate can be provided, which preferably run parallel to one another and between which the filler material is located. It is also conceivable that further cover plates are present, which penetrate the filler material and, for example, form a cover plate intermediate level.

An intermediate level may be necessary, for example, to increase the rigidity of the ceiling assembly and to accommodate components within the ceiling assembly or to hold them together or stiffen them together in their overall structure. The basic idea, however, is a sandwich design that enables a ceiling assembly which can be handled in a modular manner and which can be connected to the drum elements as a whole on-site, in particular can be placed on top of the drum elements, preferably with the turnstile being accommodated in a rotatable manner between the drum elements.

Thus, the modular ceiling assembly results in an assembly which can be handled individually and can be attached to the drum elements and/or the turnstile and can be detached again, in particular reversibly, from the drum elements and/or the turnstile. For example, the ceiling assembly can be prefabricated at the factory such that the ceiling assembly only has to be connected to the drum elements and the turnstile at the destination, without the basic components of the ceiling assembly having to be assembled or joined on-site. This results in significantly shorter assembly times and the general design of the ceiling assembly is simplified. According to the idea of the disclosure, the ceiling assembly is, in this regard, designed as a module, which can be attached to the other components of the revolving door and which can be arranged on the drum walls and the turnstile and can also be removed from the position of the arrangement again.

According to a further embodiment, the basic structure of the ceiling assembly provides that structural elements and/or functional elements are accommodated at least partially on or above the bottom cover plate and/or on or above the top cover plate and in particular in the region of the filler material. It goes without saying that structural elements and/or functional elements can also protrude laterally, that is to say in particular projecting radially or from the cover plates at the top or bottom. In particular, the structural elements and/or functional elements can be surrounded by the filler material or they are embedded in the filler material. For example, a disc motor for driving the turnstile in a rotatable manner can be arranged on the bottom of the ceiling assembly such that it is for example partially integrated within the ceiling assembly and partially protrudes from it. Motors of this type are also referred to as torque or pancake motors and are usually connected to the turnstile without gears. The same applies, for example, to connecting elements for connecting the ceiling assembly to the drum elements or to upper structural elements of a building facade, which can also protrude out of the basic structure of the ceiling assembly in sections.

The structural elements can, for example, pass through the ceiling assembly diametrically and/or the structural elements can connect the top and the bottom cover plates to one another or be connected to just one cover plate. Although the filler material is placed between the cover plates such that it surrounds the structural elements and/or the functional elements, the structural elements and/or the functional elements may also divide the filler material into a plurality of partial elements, when the elements completely traverse the ceiling assembly, for example. With regard to the structural elements, it is conceivable, for example, to have a framework-like design, a star-shaped design or, for example, a rectangular or hexagonal design in order to correspondingly stiffen the ceiling assembly.

Furthermore, the bottom cover plate, but also the top cover plate if required, has openings such that functional elements can be arranged in conjunction with the openings. The optional openings in the upper and/or lower region of the ceiling assembly, but also in the lateral circumferential region if required, enable the integration of functional elements on-site, for example a drive, a control unit, a sensor device, an illumination device, a loudspeaker device, a power supply, a locking device, a ventilation device, a heating element and/or the like, which can be inserted into the openings or into other recesses or intermediate regions in the filler material.

The inner glass element and the outer glass element can particularly advantageously be connected to one another in a materially-bonded manner. In particular, the inner and outer glass elements can together form a laminated safety glass (LSG), which gives the drum walls particular strength and makes them shatterproof. For example, it is advantageous that the inner glass element and the outer glass element are connected to one another by means of at least one plastic film. When producing this glass laminate, the inner glass element can be provided with a correspondingly shorter vertical height and connected to the outer glass element.

Further advantageously, at least one profile element is provided which rests on the upper finishing surface of the inner glass element and/or on an upper finishing surface of the outer glass element, with the ceiling assembly being accommodated in or on the profile element. The profile element is preferably adhered to the inner glass element and/or to the outer glass element, for example via the upper finishing surface of the inner glass element and via the inner surface of the outer glass element. Alternatively or additionally, the profile element can also be glued to the ceiling assembly or attached in a detachable manner with fastening means.

The profile element preferably has a first leg and a second leg that is also designed perpendicularly such that the profile element has in particular an L-shape or a T-shape or a Z-shape, in particular with the first leg resting on the finishing surface of the inner glass element and/or with the second leg adjoining the inner side of the outer glass element. In particular, the profile element can have the same curvature as the curvature of the glass elements such that the profile element can be inserted into the inner side of the glass elements accordingly. With the Z-shape, one or both parallel legs can run at right angles to the transverse leg.

A region of the lateral offset and/or at least one region of the outer glass element, which protrudes above the inner glass element in height, can particularly advantageously have a coating or be coloured or be designed as frosted glass.

This makes any unsightly joints invisible. It is conceivable that the coating has free regions if, for example, sensors are arranged that can detect through the free regions.

Furthermore, on the drum elements, in particular on the outside or inside, can be configured at least one support profile which preferably has a load-bearing connection with the ceiling assembly. For example, it is conceivable that the support profile extends vertically on the outer side of the drum elements and has a height that is flush with or slightly exceeds the height of the outer glass element. If the ceiling assembly has structural elements, these can be connected to the support profile, with the support profile also being able to serve as a connecting profile for a façade or wall in or on which the revolving door is arranged or configured.

It is also conceivable that at least one of the drum elements has a display and/or one of the door leaf elements, in particular an LCD, for displaying information. This allows the appearance and/or functionality of the revolving door to be further improved. In particular, the display can be arranged on, in or behind the inner glass element.

It is also conceivable that the display is designed for interaction with a person, in particular by means of touch input, preferably with the interaction enabling the rotational speed of the turnstile to be stopped and/or changed. In particular, an emergency stop of the rotation can thus be carried out by a user, a person inside the revolving door. This is in particular an improvement over conventional systems in which an emergency stop function is only possible from outside the revolving door. The safety of users can thus be increased even in unforeseeable situations.

The advantages of the disclosure are further achieved by a method for assembling a revolving door, which is designed in particular in accordance with the features listed above, with the method comprising at least the following steps:

connecting an inner, in particular curved, glass element to an outer, in particular curved, glass element, forming at least one lateral offset.

It is also conceivable that the following steps are carried out:

positioning the drum elements in an opposing arrangement, preferably: indirect or direct placement of a ceiling assembly on an upper finishing surface of the inner glass element and/or on an upper finishing surface of the outer glass element. The height specifications refer in particular to the installed state of the revolving door.

To form the drum elements, the inner glass elements can be adhered to the outer glass elements in a materially-bonded manner or connected to one another by means of at least one film, in particular to form a laminated safety glass (LSG).

Furthermore, a support profile and/or the ceiling assembly can be connected and/or adhered to the drum elements, in particular by arranging a lateral profile element and/or a profile element on the inner glass element and/or on the outer glass element. In addition, a profile element can be configured which is placed on the upper finishing surface of the inner glass element and on which the ceiling assembly is accommodated. This improves the load transfer from the ceiling assembly to the inner and, in some cases, the outer glass element.

Particularly advantageously, the support profile and/or the ceiling assembly can be detachably adhered or detachably screwed or clamped to the drum elements and in particular to the profile element after the profile element has been adhered to the inner and/or outer glass element and/or to the ceiling assembly.

It should be explicitly mentioned that features of the method can be transferred to the revolving door according to the disclosure and vice versa as according to the disclosure.

BRIEF DESCRIPTION OF THE DRAWINGS

Further measures that improve the disclosure will be outlined in greater detail below together with the description of a preferred exemplary embodiment of the disclosure on the basis of the figures, in which is shown.

DETAILED DESCRIPTION OF THE DRAWINGS

Figure 1:
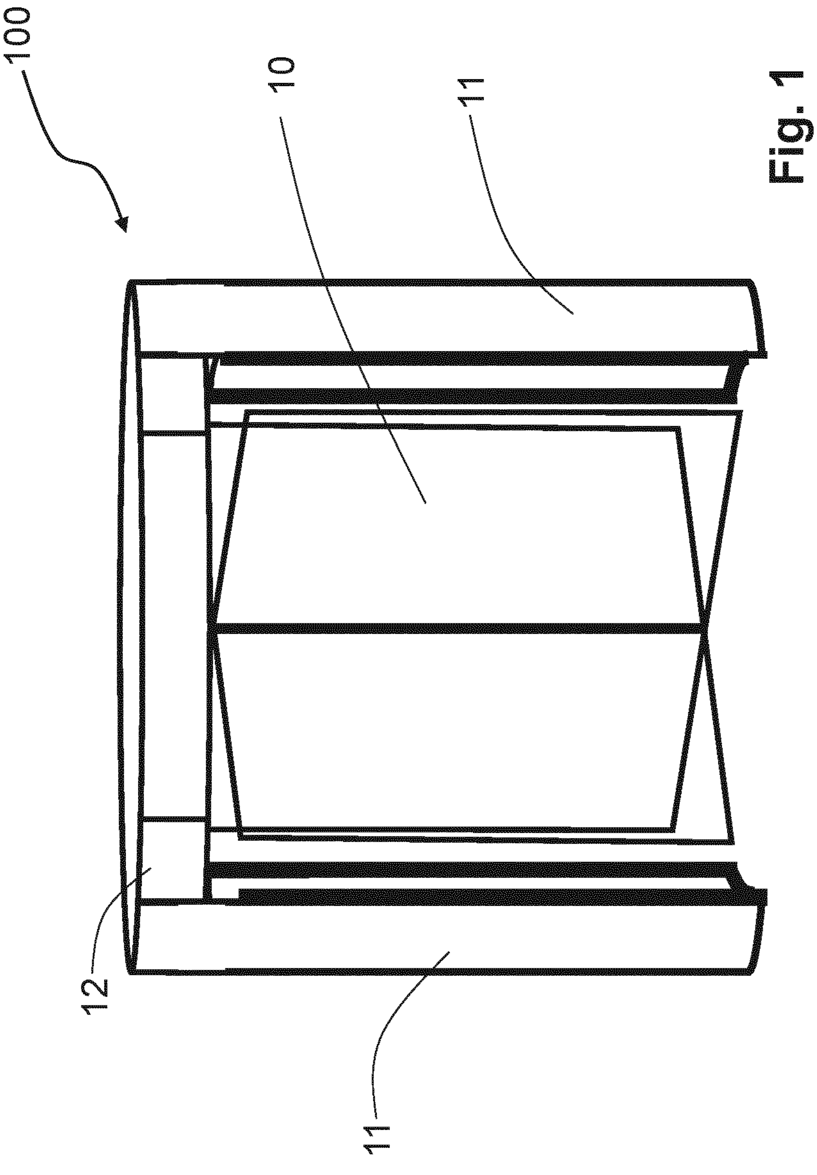
FIG. 1 a general view of the revolving door with a design according to the disclosure, FIG. 2 an overhead view of the components of the revolving door, FIG. 3 a top view of a first drum element, FIG. 4 a top view of a second drum element, FIG. 5 a detailed view of the transition of the ceiling assembly into a drum element, FIG. 6 a perspective view of the upper arrangement of the ceiling assembly on the drum elements, and FIG. 7 another detailed view of the arrangement of the ceiling assembly on a drum element.

FIG. 1 shows the revolving door 100 having a turnstile 10 that is rotatably accommodated between two drum elements 11. On the upper side of the turnstile 10 is located the ceiling assembly 12, which is designed to be modular and is accommodated as an assembly on the drum elements 11. The turnstile 10 is rotatably mounted on the floor side and on the underside of the ceiling assembly 12.

Figure 2:
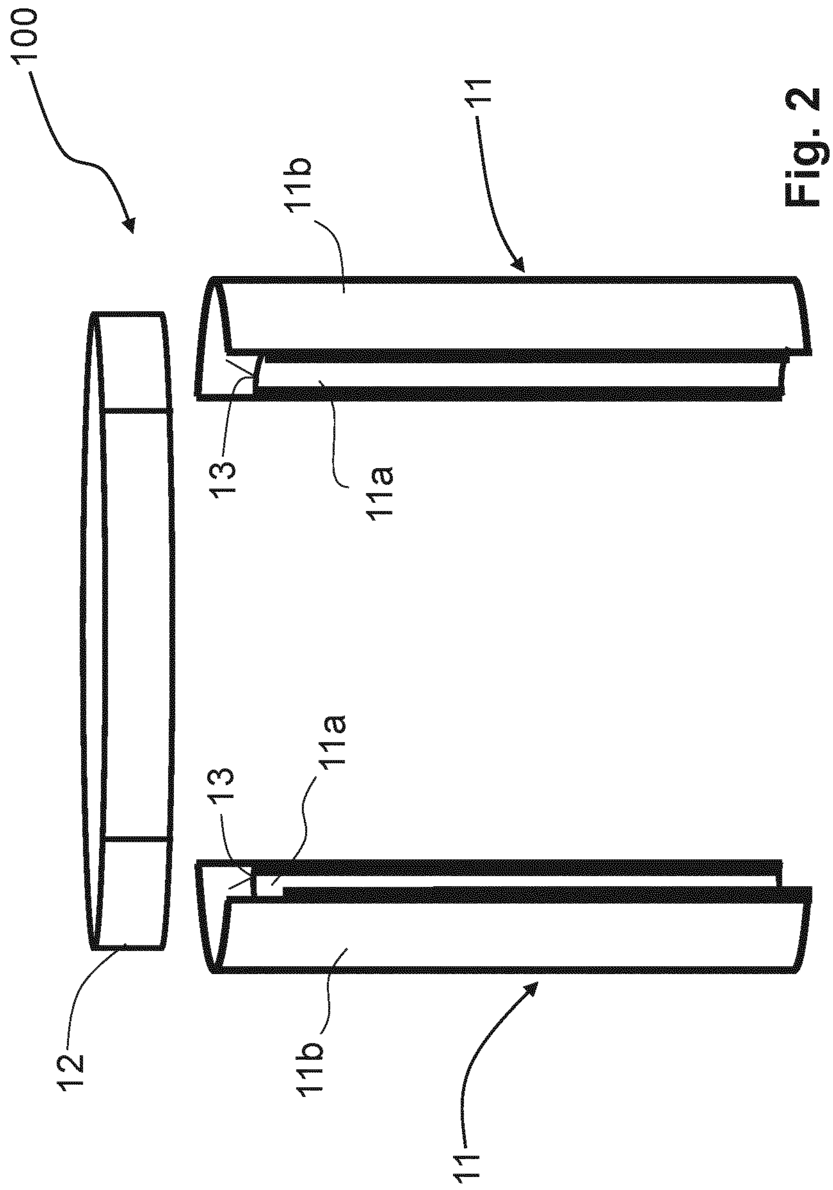

FIG. 2 shows an overhead view of the components of the revolving door 100 with the drum elements 11, which are designed to accommodate the ceiling assembly 12 on the upper side. For this purpose, the drum elements 11 have an inner glass element 11*a* and an outer glass element 11*b*, with the inner glass element 11*a* having a shorter vertical length than the outer glass element 11*b* such that the outer glass element 11*b* projects beyond the inner glass element 11*a* and at least partially or completely encloses the ceiling assembly 12 on the outside when the ceiling assembly 12 rests at least indirectly on the upper finishing surface 13 of the inner glass element 11*a*. The view shows that the outer glass element 11*b* projects beyond the inner glass element 11*a* by approximately the structural height of the ceiling assembly 12. If the ceiling assembly 12 is arranged on the drum elements 11, the upper edge of the outer glass element 11*b* is approximately flush with the upper side of the ceiling assembly 12.

Figure 4:
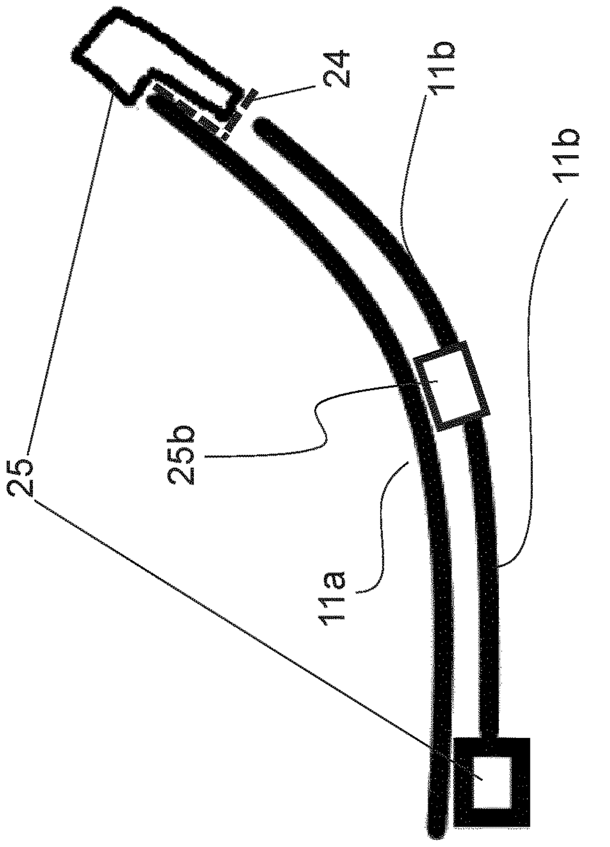
Figure 3:
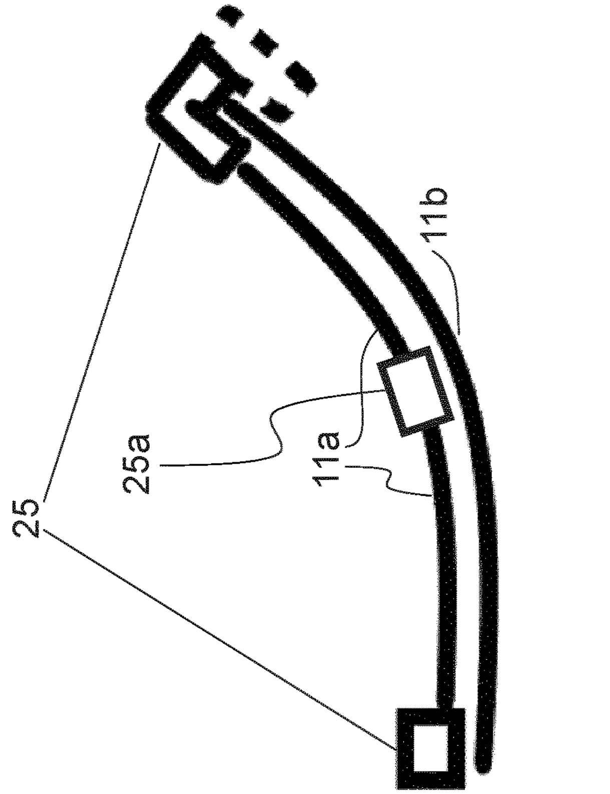

FIGS. 3 and 4 each show a schematic top view, not to scale, of a drum element according to the disclosure. A lateral offset is visible between the inner and outer glass element 11*a*, 11*b*, in which a support profile 25 is arranged. According to FIG. 4, on the right-hand side between the support profile 25 and the drum element is also arranged a lateral profile element 24, which simplifies the connection. The individual support profiles 25 can:

protrude radially from the drum element-indicated on the left in FIG. 3 and/or protrude circumferentially from the drum element-indicated on the right in FIGS. 3 and 4 and/or be radially flush with the drum element-indicated on the right in FIG. 4 and/or be circumferentially flush with the drum element-indicated on the left in FIG. 4.

In FIG. 3, the inner glass element 11*a* is further divided into two partial elements by an intermediate support profile

25*a*. In FIG. 4, the outer glass element 11*b* is divided into two partial elements by an intermediate support profile 25*b*. The intermediate support profile 25*a*, 25*b*, designed as a supporting post, provides further support for the overall structure. The intermediate support profile 25*a*, 25*b* can (not represented in this way) be flush with the partial elements and thus be integrated almost seamlessly into the drum element.

Sub-combinations of each of the options shown for integrating the support profile 25 and the intermediate support profile 25*a*, 25*b* on/into the drum element can of course be in accordance with the disclosure. A design of this type visibly and statically improves the integration of the support profile 25 and the intermediate support profile 25*a*, 25*b* into the revolving door. The support profile 15 described below can also be designed according to this example.

Figure 5:
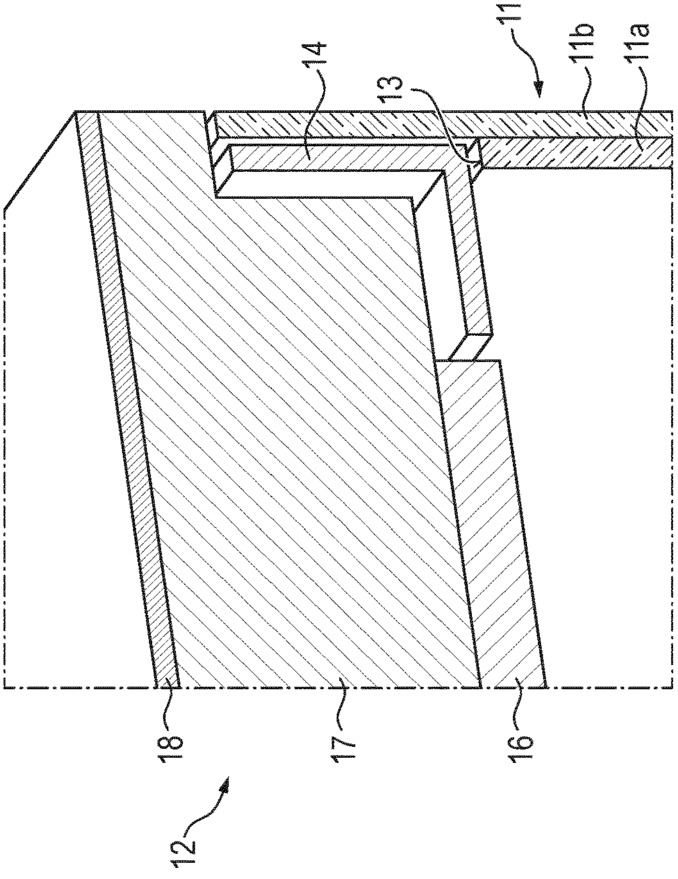

FIG. 5 shows a detailed view of the arrangement of the ceiling assembly 12 on a drum element 11 in a perspective manner. The ceiling assembly 12 is constructed with a bottom cover plate 16 and a top cover plate 18, between which a filler material 17 is sandwiched. The drum element 11 has the inner glass element 11*a* and the outer glass element 11*b*, and the outer glass element 11*b* projects beyond the inner glass element 11*a* on the outside in its extension in the vertical direction. The height difference between the upper finishing surface 13 of the inner glass element 11*a* and the upper edge of the outer glass element 11*b* corresponds to a partial height of the ceiling assembly 12 such that this exemplary embodiment shows that the drum element 11 does not completely enclose the ceiling assembly 12, but at least partially on the outside.

On the inside of the drum element 11 is arranged a profile element 14, which rests with a vertical leg on the inside of the outer glass element 11*b* and which projects with a horizontally running leg radially inwards into the revolving door such that the ceiling assembly 12 can rest on the horizontally running leg. The profile element 14 sits on the finishing surface 13 of the inner glass element 11*a* and forms a simple angled profile. The profile element 14 is thus arranged between the ceiling assembly 12 and the drum element 11 and the ceiling assembly 12 is thus arranged only indirectly on the drum element 11, which represents a variant included by the disclosure, and the ceiling assembly 12 can also rest directly on the drum element 11, for example with the bottom cover plate 16 or with the filler material or with a structural element present therein or even with an externally projecting edge of the top cover plate 18.

Figure 6:
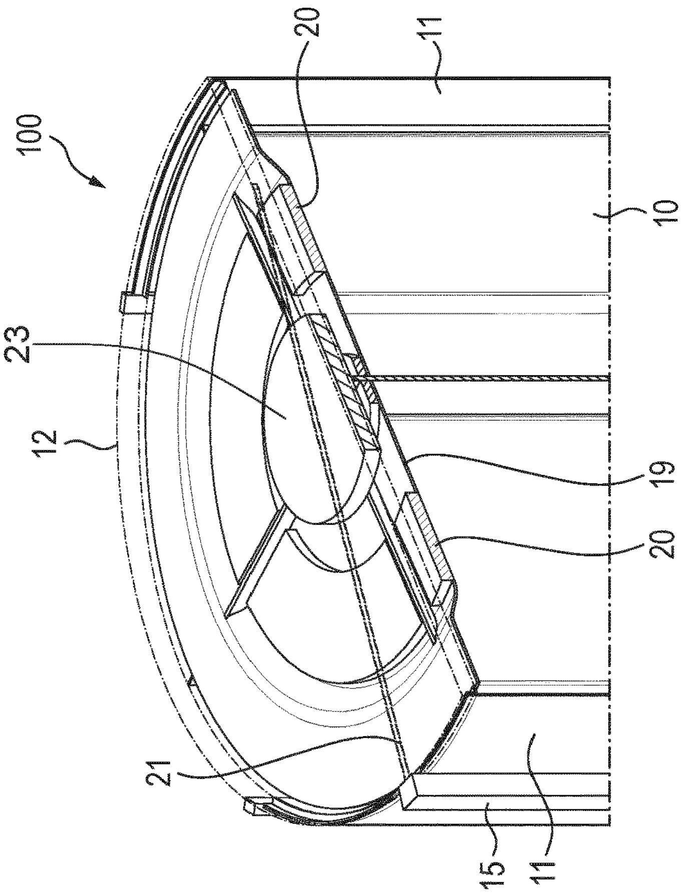

FIG. 6 shows a further view of the arrangement of the ceiling assembly 12 on the top of the drum elements 11, with the ceiling assembly 12 being shown with a structural component 21, which is connected to a support profile 15 arranged on the outside of the front drum element 11.

On the underside of the ceiling assembly 12, the revolving door 100 has a ceiling device 19, which can in particular be designed to rotate with the turnstile 10 and is arranged approximately parallel to the underside of the ceiling assembly 12. The ceiling device 19 has for example illumination means 20, which can, however, also only have transparent surface bodies, and the actual illumination means can be configured in the ceiling assembly 12. In the center of the ceiling assembly 12 is located a motor 23, which is designed by way of example as an electronically commutated plate motor and is connected to the turnstile 10 without gears. The rotating part of the motor 23 can also rotate the ceiling device 19 together with the turnstile 10.

Figure 7:
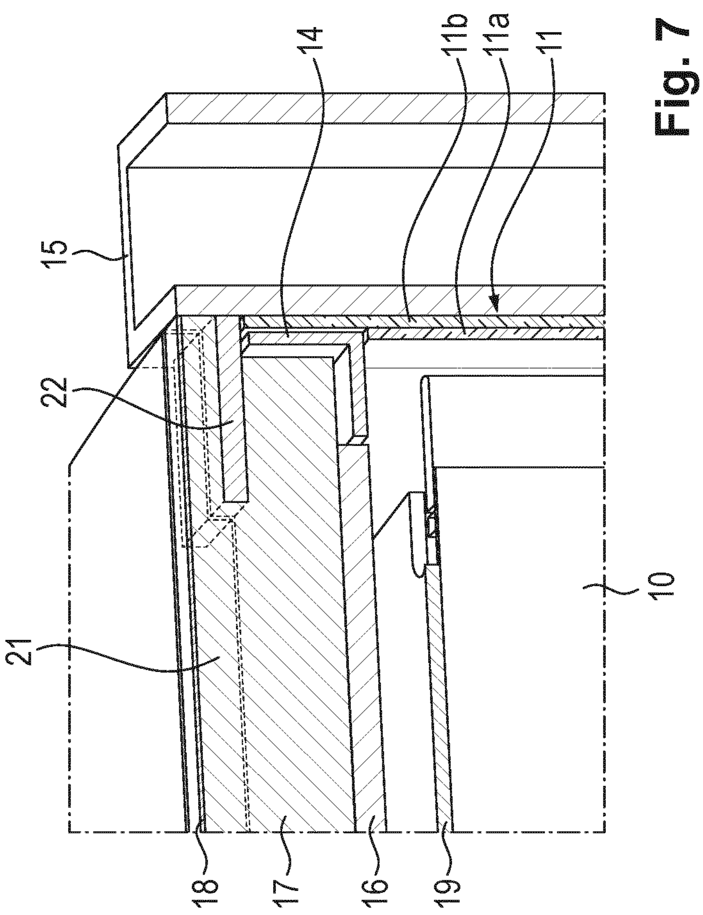

Lastly, FIG. 7 shows a further detailed view of the arrangement of the ceiling assembly 12 on a drum element 11, with the profile element 14 resting on the upper finishing surface 13 of the inner glass element 11*a* and adjoining the outer glass element 11*b* on the inside. At the top of the profile element 14 is shown a connecting means 22, which is connected to a structural component 21 of the ceiling assembly 12. The ceiling assembly 12 again has the bottom cover plate 16, the filler material 17 and the top cover plate 18, with the connecting means 22 being designed as a tab-like extension on the support profile 15 and projecting radially inwards into the ceiling assembly 12. This allows an advantageous load transfer from the ceiling assembly 12 into the drum element 11 as well as additionally or exclusively into the support profile 15. At the bottom is shown the turnstile 10, on which the ceiling device 19 is arranged to rotate with it. In a view not represented, the support profile 15 can also be designed analogously to the example in FIGS. 4 and 5.

The design of the disclosure is not restricted to the preferred exemplary embodiment indicated above. In fact, a number of variants is conceivable, which make use of the represented solution even in the case of fundamentally different designs. All features and/or advantages emerging from the claims, the description or the drawings, including constructive details or spatial arrangements, may be essential to the disclosure even in the most varied combinations.

The invention claimed is:

1. A revolving door having a turnstile that is arranged between opposite drum elements and having a ceiling assembly which is arranged on the drum elements at the top and on which the turnstile is rotatably mounted, wherein at least one of the drum elements has an inner glass element and an outer glass element, wherein the drum element has a lateral offset, on both sides of the drum element, between the inner glass element and the outer glass element, and that a a support profile is arranged in the lateral offset, wherein a profile element is disposed on an upper finishing surface of the inner glass element and adjoins the outer glass element on an inside of the drum element, whereby the profile element includes a vertical leg disposed on the outer glass element and a horizontal leg disposed radially inward into the revolving door.

2. The revolving door according to claim 1, wherein the support profile is indirectly connected to at least one of the drum element and the ceiling assembly via a lateral profile element in a materially-bonded or force-fitting or form-fitting manner.

3. The revolving door according to claim 1, wherein the inner glass element comprises at least two partial elements which are arranged next to one another, in alignment, and which are arranged at a distance from one another in order to form an intermediate space, wherein an intermediate support profile is arranged in the intermediate space, and in that the outer glass element comprises at least two partial elements which are arranged next to one another, in alignment, and which are arranged at a distance from one another in order to form an intermediate space, wherein an intermediate support profile is arranged in the intermediate space.

4. The revolving door according to claim 1, wherein the ceiling assembly rests directly or indirectly on an upper finishing surface of the inner glass element or on an upper finishing surface of the outer glass element.

5. The revolving door according to claim 1, wherein the inner glass element has a shorter vertical length than the outer glass element such that the outer glass element at least partially or completely encloses the ceiling assembly on the outside.

6. The revolving door according to claim 1, wherein the inner glass element and the outer glass element are connected to one another in a materially-bonded manner.

7. The revolving door according to claim 1, wherein a region of the lateral offset or at least one region of the outer glass element, which projects beyond the inner glass element in height, has a coating or is coloured.

8. The revolving door according to claim 1, wherein said support profile, which has a load-bearing connection to the ceiling assembly, is configured on the drum elements.

9. The revolving door according to claim 1, wherein the ceiling assembly has a sandwich structure with a bottom cover plate, a filler material and a top cover plate.

10. A method for assembling a revolving door according to claim 1, wherein the method comprises at least the following steps:

connecting the inner glass element to the outer glass element, forming the lateral offset, wherein said support profile is arranged in or on the lateral offset.

11. The method according to claim 10, wherein the inner glass elements are adhered to the outer glass elements in a materially-bonded manner or connected to one another with at least one film to form the drum elements.

12. The method according to claim 10, wherein the revolving door comprises a ceiling assembly arranged on the drum elements at the top, wherein the support profile or the ceiling assembly is connected or adhered to the drum elements, by arranging a lateral profile element or said profile element on the inner glass element or on the outer glass element.

13. The revolving door according to claim 1, wherein the inner glass element and the outer glass element are not laterally flush at the at least one lateral offset.

* * * * *